(12) United States Patent
Li

(10) Patent No.: US 9,726,317 B2
(45) Date of Patent: Aug. 8, 2017

(54) MOVABLE SEAT AND RAIL DEVICE WITH THE MOVABLE SEAT

(71) Applicant: GISON MACHINERY CO., LTD., Taichung (TW)

(72) Inventor: Kuang-Tai Li, Taichung (TW)

(73) Assignee: GISON MACHINERY CO., LTD., Taichung (TW)

( * ) Notice: Subject to any disclaimer, the term of this patent is extended or adjusted under 35 U.S.C. 154(b) by 0 days.

(21) Appl. No.: 14/982,056

(22) Filed: Dec. 29, 2015

(65) Prior Publication Data
US 2017/0057031 A1  Mar. 2, 2017

(30) Foreign Application Priority Data

Aug. 27, 2015 (TW) .............................. 104128210 A

(51) Int. Cl.
| | |
|---|---|
| *F16B 47/00* | (2006.01) |
| *F16M 11/04* | (2006.01) |
| *B23Q 1/01* | (2006.01) |
| *F16M 11/18* | (2006.01) |
| *B28D 7/00* | (2006.01) |
| *B23Q 9/00* | (2006.01) |

(52) U.S. Cl.
CPC ........... *F16M 11/045* (2013.01); *B23Q 1/012* (2013.01); *B23Q 1/017* (2013.01); *B23Q 9/0042* (2013.01); *B28D 7/00* (2013.01); *F16M 11/048* (2013.01); *F16M 11/18* (2013.01)

(58) Field of Classification Search
CPC ...... F16B 47/00; F16B 47/006; F16B 47/003; F16B 45/00; F16B 2001/0035; F16B 11/006; F16B 1/0071; F16B 1/00; F16B 1/0014; F16B 21/09; F16B 2/12; F16B 2/185; F16B 45/02; F16B 5/0692; F16B 7/10
USPC ......... 248/205.5, 205.7, 205.8, 205.9, 206.1, 248/637, 646, 676, 680
See application file for complete search history.

(56) References Cited

U.S. PATENT DOCUMENTS

| | | | |
|---|---|---|---|
| 7,165,261 B2* | 1/2007 | Chen ...................... | G11B 33/08 720/610 |
| 2005/0247840 A1* | 11/2005 | Zhadanov ............. | F16B 47/006 248/316.7 |
| 2007/0051859 A1* | 3/2007 | Richter ................... | F16B 47/00 248/205.8 |
| 2008/0210834 A1* | 9/2008 | Takahashi ............... | F16B 47/00 248/205.8 |

(Continued)

Primary Examiner — Steven Marsh
(74) Attorney, Agent, or Firm — Guice Patents PLLC

(57) ABSTRACT

A movable seat and a rail device. The movable seat includes a main body; an air passage, an air sucking passage and an air intake passage formed in the main body; a sucker disposed under bottom face of the main body and an operation/control member mounted on the main body. When the operation/control member is positioned in a locking position, the air passage or the air intake passage keeps in a communication state and make the sucker a sucking force. When the operation/control member is positioned in a releasing position, the air passage or the air intake passage is blocked. By means of easy operation, the movable seat can create sucking force and locate or stop providing sucking force. One or more movable seats can be connected with multiple beams to form the rail device, which can be quickly located or moved.

18 Claims, 18 Drawing Sheets

(56) References Cited

U.S. PATENT DOCUMENTS

| | | | | |
|---|---|---|---|---|
| 2008/0230660 A1* | 9/2008 | Chien | ................... | F16B 47/00 |
| | | | | 248/205.5 |
| 2008/0277544 A1* | 11/2008 | Chen | ................... | F16B 47/00 |
| | | | | 248/205.9 |
| 2010/0282930 A1* | 11/2010 | Hsu | ................... | F16M 11/14 |
| | | | | 248/205.5 |
| 2011/0127395 A1* | 6/2011 | Ostendarp | ............ | F16B 47/006 |
| | | | | 248/205.8 |
| 2011/0220767 A1* | 9/2011 | Stewart | ................ | A47G 19/00 |
| | | | | 248/121 |

* cited by examiner

MOVABLE SEAT AND RAIL DEVICE WITH THE MOVABLE SEAT

BACKGROUND OF THE INVENTION

1. Field of the Invention

The present invention relates generally to a movable mechanism and an assembly thereof, and more particularly to a movable seat and a rail device composed of one or more movable seats.

2. Description of the Related Art

When processing various board materials, for example, boring a stone material, in a conventionally operation procedure, it is necessary to first fix the board material on a processing table face and then set up a rail and then assemble a processing machine on the rail. In this case, the processing machine can be guided by the rail to cut or mill the board material. In another conventional operation procedure, a processing table is first prepared. A rail and a processing machine are previously arranged on the processing platform. Then, the board material to be processed is transferred onto the processing table and secured by a holding device. Then the board material is cut or milled.

In the conventional technique, the rails for guiding the process ing machine are all fixed and cannot be moved or hard to move. Therefore, the conventional rails lack mobility and flexibility. It is inconvenient to move the rails and processing machine to another site to perform the cutting/milling operation.

SUMMARY OF THE INVENTION

It is therefore a primary object of the present invention to provide a movable seat, which can be conveniently moved and quickly located and released from the locating state.

It is a further object of the present invention to provide a rail device composed of at least one the above movable seat. The rail device can be conveniently moved and located.

The movable seat of the present invention includes:
a main body;
an air passage formed in the main body;
a sucker disposed under a bottom face of the main body and having an air chamber;
an air sucking passage disposed in the main body, one end of the air sucking passage communicating with the air passage, the other end of the air sucking passage communicating with the air chamber of the sucker;
an air intake passage disposed in the main body, an inner end of the air intake passage communicating with the air passage;
a slide passage disposed in the main body and intersecting the air passage or the air intake passage;
a support column disposed in the slide passage and movable along the slide passage; and
an operation/control member mounted on the main body for driving the support column to move; when the operation/control member is positioned in a locking position, the support column being positioned in a communication position, whereby the air passage or the air intake passage keeps in a communication state; when the operation/control member is positioned in a releasing position, the support column being positioned in a blocking position to block the air passage or the air intake passage.

Accordingly, the operation/control member can be shifted to control the air to flow through the air passage or not. When air flows through the air passage, the air in the air sucking passage is sucked to the air passage to make the sucker create sucking force. Accordingly, the movable seat sucks and attaches to the surface of an object. When it is desired to move the movable seat, an operator only needs to stop the air in the air passage from flowing so as to stop the sucker from creating sucking force. Therefore, the movable seat can be easily and quickly located or released from the locating state.

The rail device of the present invention includes:
multiple movable seats as aforesaid; and
a pair of parallel first beams, and a pair of parallel second beams, the first and second beams and the movable seat are connected with each other to form the rail device with a parallelogram configuration.

By means of locating the movable seats and releasing the movable seats from the locating state, the rail device can be quickly located in a specific position and quickly restorable to a mobile state.

The present invention can be best understood through the following description and accompanying drawings, wherein:

DETAILED DESCRIPTION OF THE PREFERRED EMBODIMENTS

Figure 1:
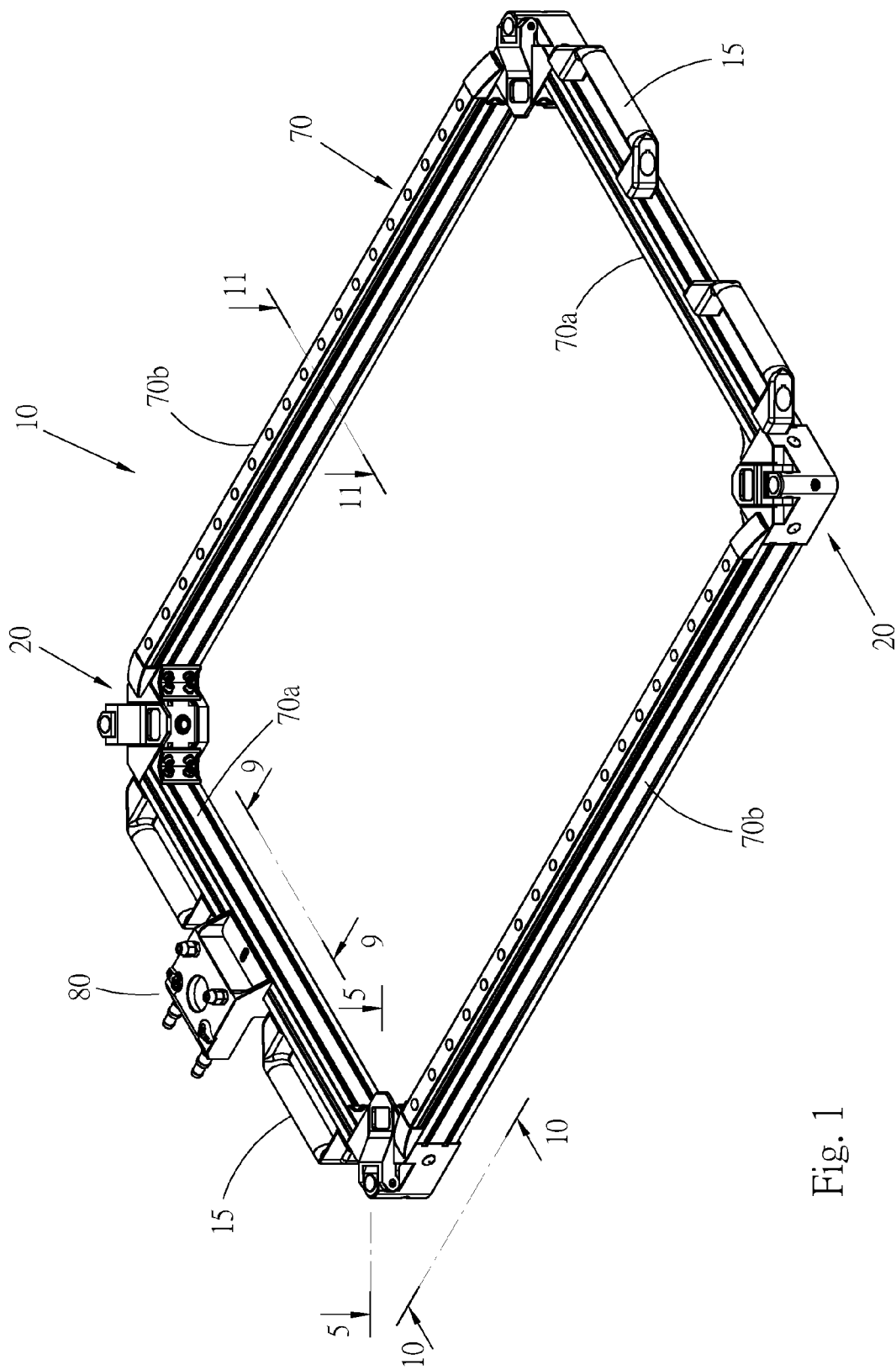
FIG. 1 is a perspective assembled of a first embodiment of the rail device of the present invention.
Figure 2:
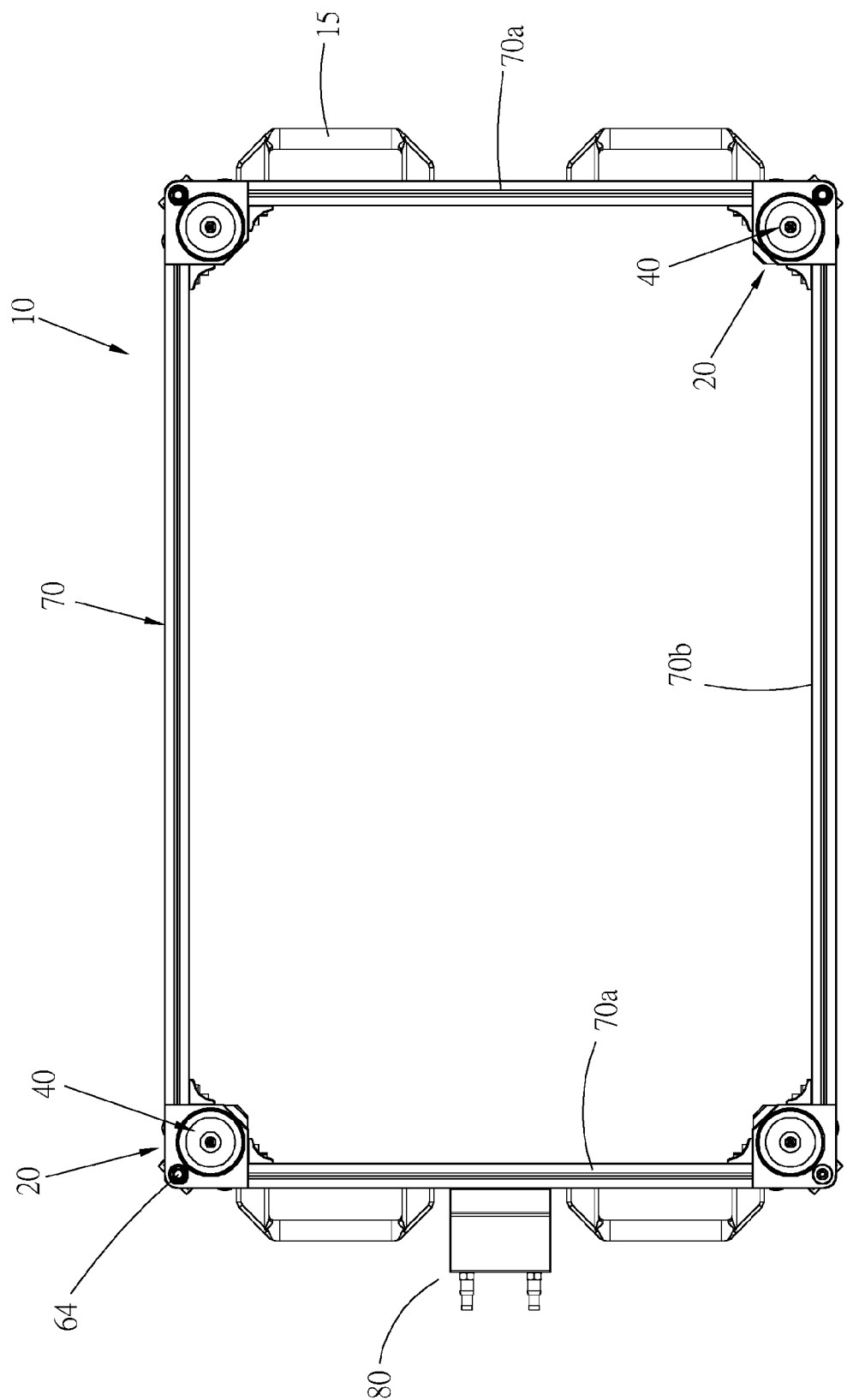
FIG. 2 is a bottom view according to FIG. 1.
Figure 3:
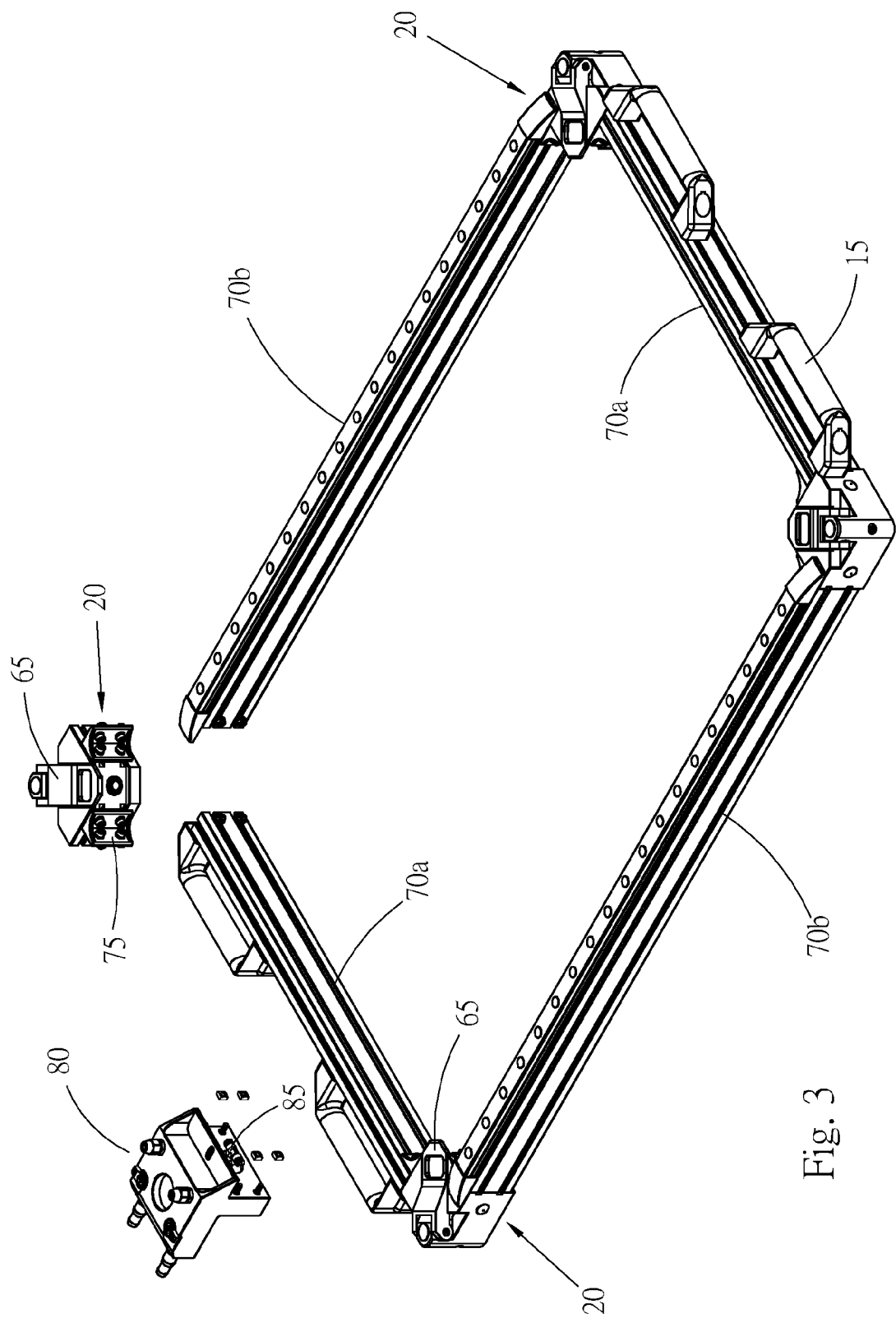
FIG. 3 is a perspective partially exploded view according to FIG. 1.

Please refer to FIGS. 1 to 3. According to a first embodiment, the movable rail device 10 of the present invention includes at least one, (for example, four) movable seats 20 and four beams 70. The four beams 70 are a pair of parallel short beams 70*a* and a pair of parallel long beams 70*b*. The movable seats 20 and the beams 70 are assembled and connected with each other to form the rail device 10 having a parallelogram configuration.

Figure 4:
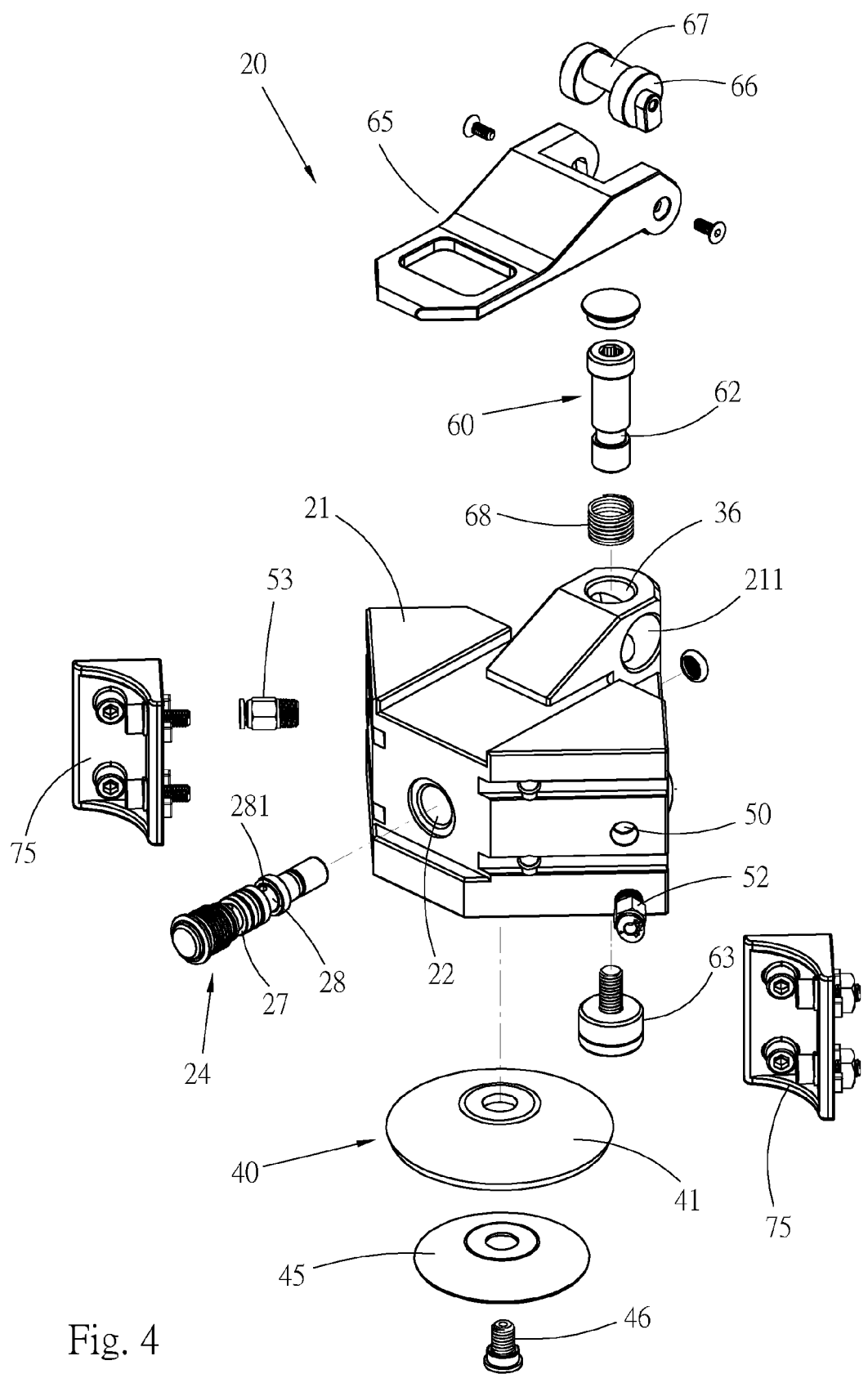
FIG. 4 is a perspective exploded view of one of the movable seats of FIG. 1.
Figure 5:
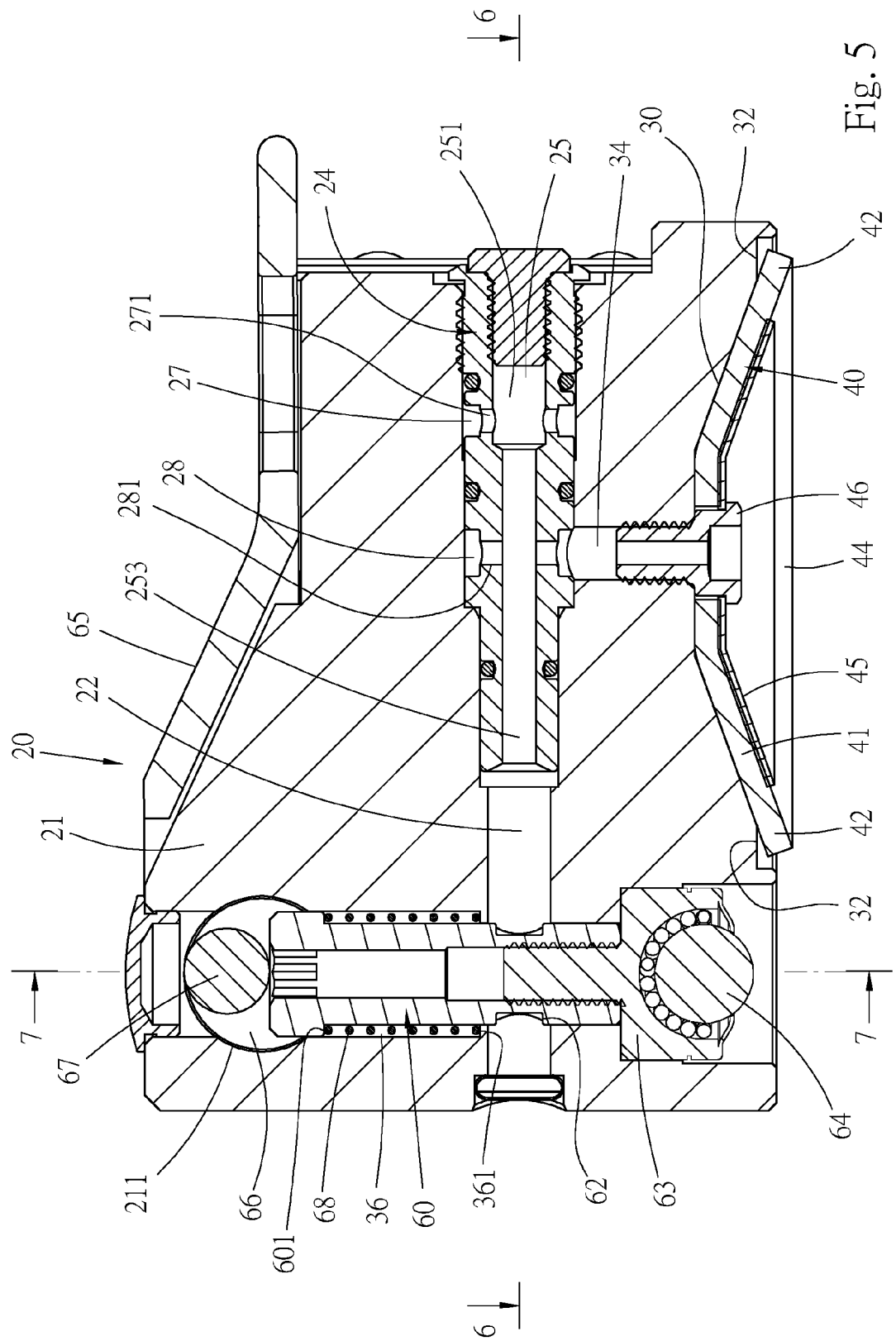
FIG. 5 is a sectional view taken along line 5-5 of FIG. 1, showing a longitudinal section of the movable seat.

Please refer to FIGS. 4 and 5. The movable seat 20 has a main body 21 and an air passage 22 formed in the main body 21. A rear end of the air passage 22 passes through the main body 21 to a periphery of the main body 21 to communicate with outer side, whereby air can flow out of the main body 21 from the rear end of the air passage. An elongated valve member 24 is mounted in the air passage 22. The valve member 24 has an internal longitudinal flow way 25. The flow way 25 is formed with a front section 251 and a rear section 253. The rear end of the flow way 25 passes through the rear end of the valve member 24, whereby the rear end of the flow way communicates with the air passage 22. The flow way 25 is a part of the air passage 22. A first annular groove 27 and a second annular groove 28 are formed on a circumference of the valve member 24. The first annular groove 27 communicates with the front section 251 of the flow way 25 via a first radial hole 271. The second annular groove 28 communicates with the flow way 25 via a second radial hole 281. In the flow path of the air passage 22 and the flow way 25, the second annular groove 28 is positioned in rear of the first annular groove 27. A fast airflow can be created in the flow way 25 such as by, but not limited to, a nozzle disposed in the flow way to make the air flow fast, so that a fast-flow section is formed in the air passage 22. In this embodiment, the flow way 25 is only an example for illustration. In practice, any design or structure that can create a fast airflow in the flow way is applicable to the air passage 34 of the present invention.

A bottom face of the main body 21 is formed with an inward concaved conic cavity 30. An annular abutment face 32 is formed around the cavity 30. An air sucking passage 34 is formed in the main body 21. One end of the air sucking passage 34 communicates with the cavity 30, while the other end of the air sucking passage 34 communicates with the air passage 22 and the second annular groove 28 of the valve member 24.

A sucker 40 is mounted in the cavity 30 of the main body 21. The sucker 40 is a tray body made of a flexible material such as rubber or silicone material. A tray-shaped holding member 45 is screwed to the main body 21 by means of one or more threaded member 46 so as to fix the sucker 40 in the cavity 30. A circumference of the sucker 40 is formed with a conic annular wall 41. An outer circumference of the annular wall 41 protrudes out of the cavity 35. The protrusion section of the annular wall 41 forms a lip 42 right positioned under the annular abutment face 32. In normal state, the lip 42 is not attached to the abutment face 32 or in contact with the abutment face 32, whereby the lip 42 is freely flexible. The lip 42 and the abutment face 32 contain therebetween an angle ranging from 20° to 40°. An air chamber 44 is formed in the sucker 40 as an inward recessed space surrounded and defined by the annular wall 41. One end of the air sucking passage 34 is positioned at the center of the sucker 40 and passes through the sucker 40 to communicate with the air chamber 44.

Figure 6:
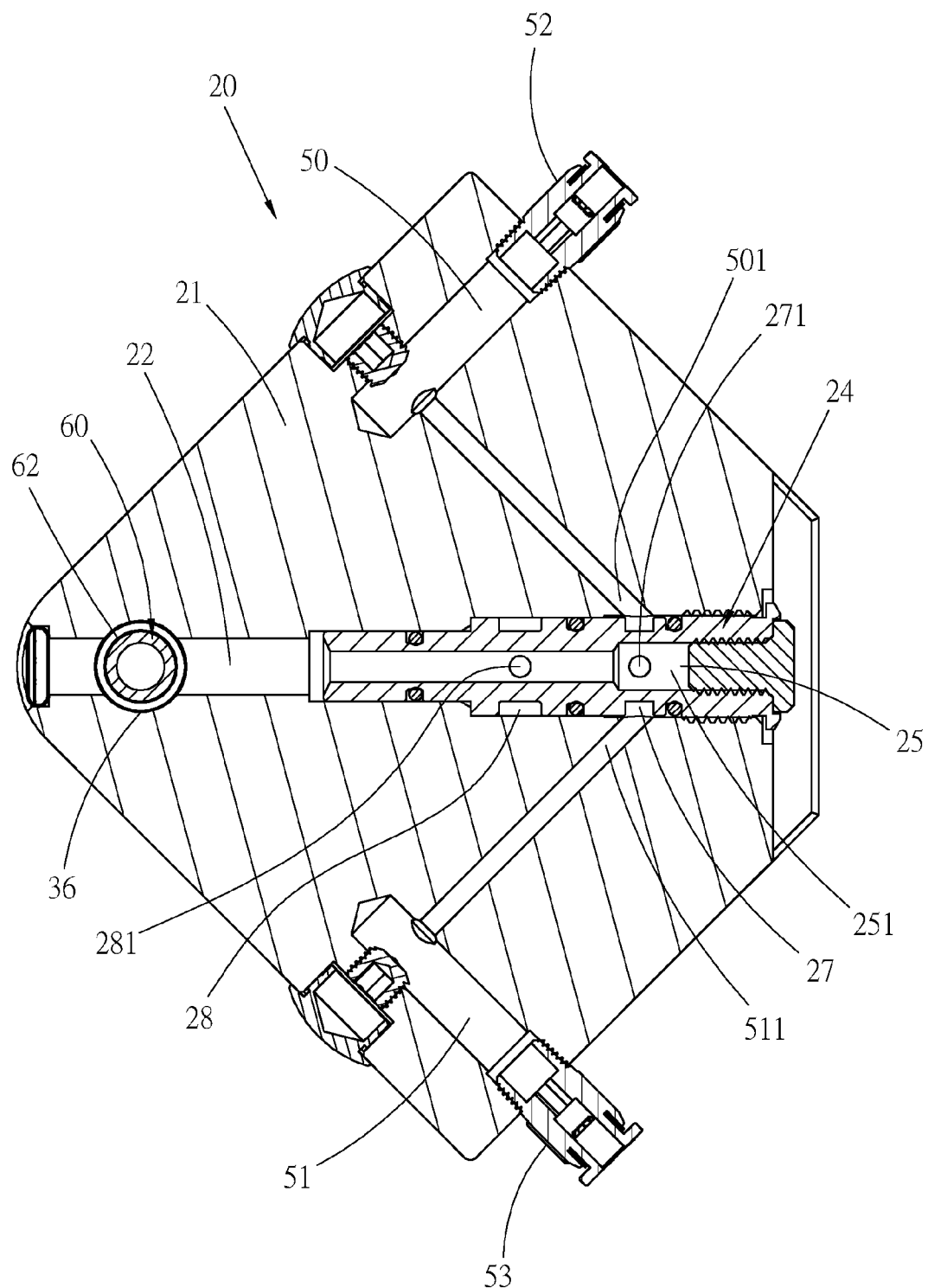
FIG. 6 is a sectional view taken along line 6-6 of FIG. 5.

Please refer to FIG. 6. An air intake passage 50 is formed in the main body 21. An outer end of the air intake passage 50 is positioned on a lateral face of the main body 21. A connector 52 is installed at the outer end of the air intake passage 50. An inner end 501 of the air intake passage 50 communicates with the front end of the air passage 22 and communicates with the front section 251 of the flow way 25 of the valve member 24 via the first annular groove 27 and the first radial hole 271.

A relay passage 51 is further formed in the main body 21. An inner end 511 of the relay passage 51 communicates with the front end of the air passage 22 and communicates with the air intake passage 50 via the first annular groove 27. An outer end of the relay passage 51 is positioned on the other lateral face of the main body 21. A connector 53 is installed at the outer end of the relay passage 51.

The air intake passage 50 and the relay passage 51 are positioned on two sides of the air passage 22 in a symmetrical form. The air intake passage 50 and the relay passage 51 are functionally switchable. That is, when air flows into the movable seat from the passage denoted by reference numeral 51, the passage denoted by reference numeral 51 becomes an air intake passage, while the passage denoted by reference numeral 50 becomes a relay passage.

Figure 7:
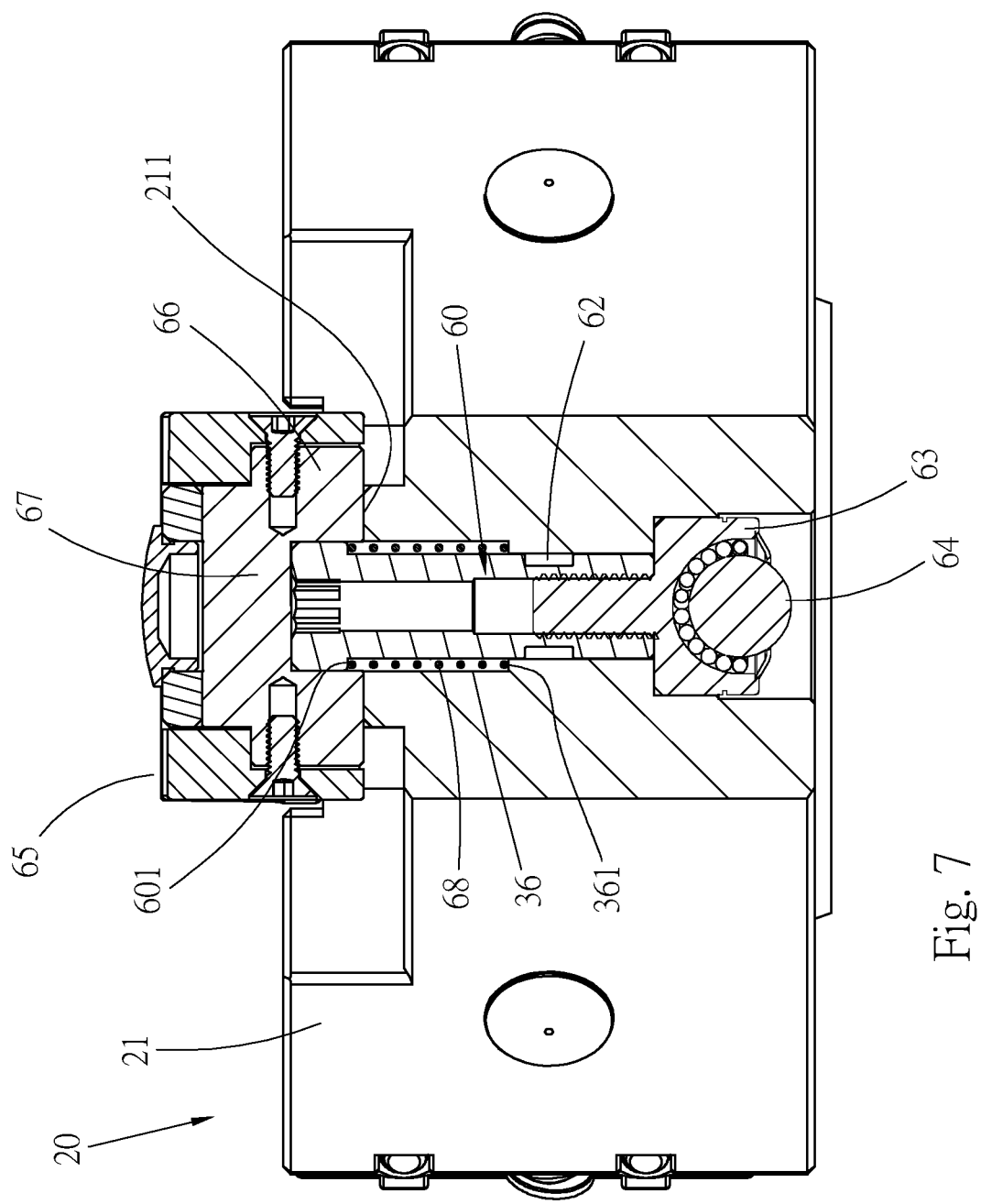
FIG. 7 is a sectional view taken along line 7-7 of FIG. 5.

Please further refer to FIGS. 4, 5 and 7. A slide passage 36 is vertically (in the up and down direction) formed in the main body 21. A bottom end of the slide passage 36 passes through the main body 21 to the bottom face thereof. The slide passage 36 intersects the rear end of the air passage 22, whereby a middle section of the slide passage 36 communicates with the air passage.

A support column 60 is disposed in the slide passage 36 of the main body 21 and vertically (up and down) movable along the slide passage. The support column 60 has a body section formed with a communication section 62. In this embodiment, the communication section 62 is, but not limited to, an annular groove. Alternatively, the communication section 62 can be a hole. A motional section 64 is disposed at bottom end of the support column 60 via an end piece 63. The motional section 64 is a rolling member such as a steel ball. The motional section 64 serves to reduce the frictional force against the move of the bottom end of the support column 60.

An operation/control member is pivotally connected with the main body 21. In this embodiment, the operation/control member is a lever member 65. One end of the lever member 65 has a pivot shaft 66 formed with a cam section 67. The lever member 65 is pivotally connected to a pivot hole 211 of top end of the main body 21 via the pivot shaft 66. The cam section 67 extends into the slide passage 36. The top end of the support column 60 can contact the cam section 67.

Figure 15:
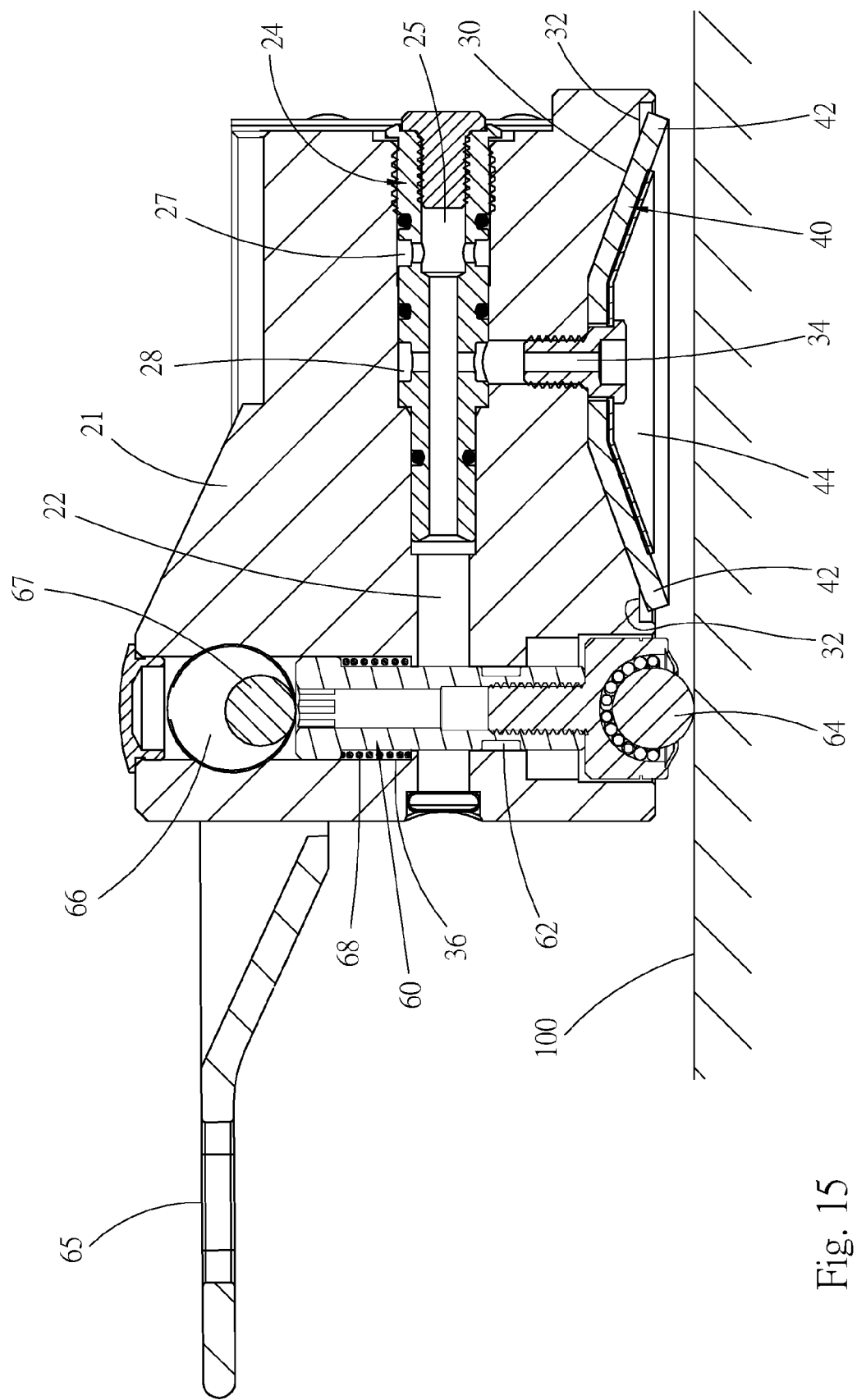
FIG. 15 is a sectional view showing that the sucking force of the movable seat of the present invention disappears.
Figure 16:
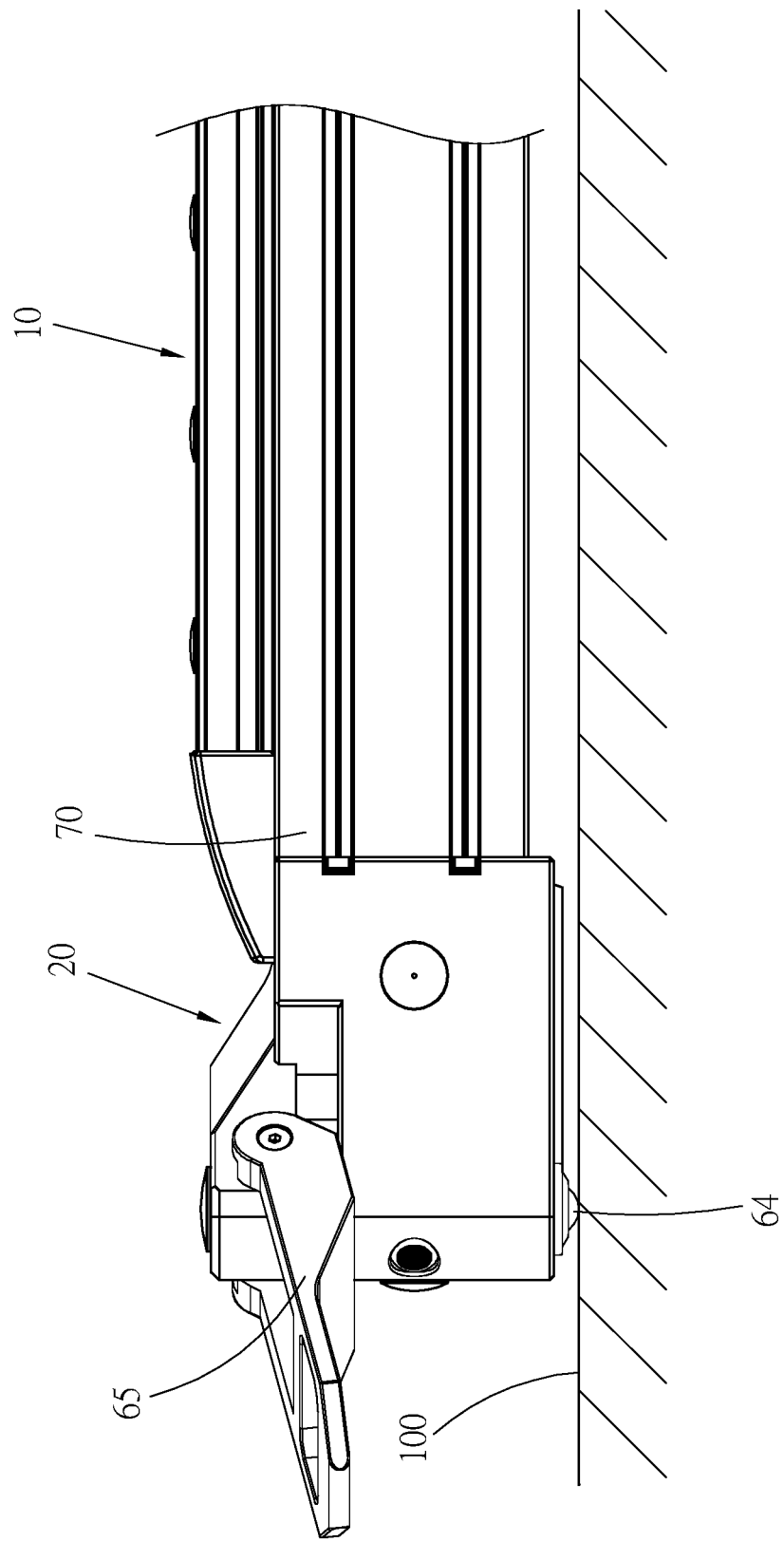
FIG. 16 is a side view of a part of the rail device of the present invention, showing that the rail device is in a movable state.

An elastic member 68 is disposed in the slide passage 36. One end of the elastic member 68 abuts against a shoulder section 601 of the support column 60. The other end of the elastic member 68 is located on an abutment edge 361 formed on a wall face of the slide passage 36. The elastic member 68 serves to provide elastic force to keep pushing the support column 60 upward and make the top end of the support column 60 in contact with the cam section 67 of the lever member 65. When the lever member 65 is positioned in an angular position leant on the top face of the main body 21 as shown in FIG. 5, the lever member 65 is positioned in a locking position. At this time, the cam section 67 is positioned at an upper dead end (first dead end) and the support column 60 is moved upward to a communication position and the motional section 64 of the bottom end of the support column 60 is moved into the slide passage 36 without protruding out from the main body 21. Under such circumstance, the communication section 62 is right positioned in the rear end of the air passage 22. When the lever member 65 is shifted to a releasing position as shown in FIG. 15, the cam section 67 is positioned in at a lower dead end to push the support column downward to an operation position. At this time, the communication section 62 leaves the air passage 22 and the motional section 64 protrudes out from the bottom face of the main body 21.

In this embodiment, four movable seats 20 and a pair of first beams 70a and a pair of second beams 70b are assembled and connected with each other to form the rail device 10 in the form of a parallelogram frame. The four movable seats 20 are respectively positioned on four corners of the frame. Two lateral faces of the main body 21 of each movable seat 20 are respectively connected with a first beam 70a and a second beam 70b via a connection member 75. The four beams 70 have identical cross-sectional structures. The beams 70 are extrusion bodies with hollow interiors. Please refer to FIG. 11. Each beam 70 has a hollow passageway 72 in longitudinal direction. Several handles 15 are mounted on the beams 70 for easy transfer of the rail device.

Figure 8:
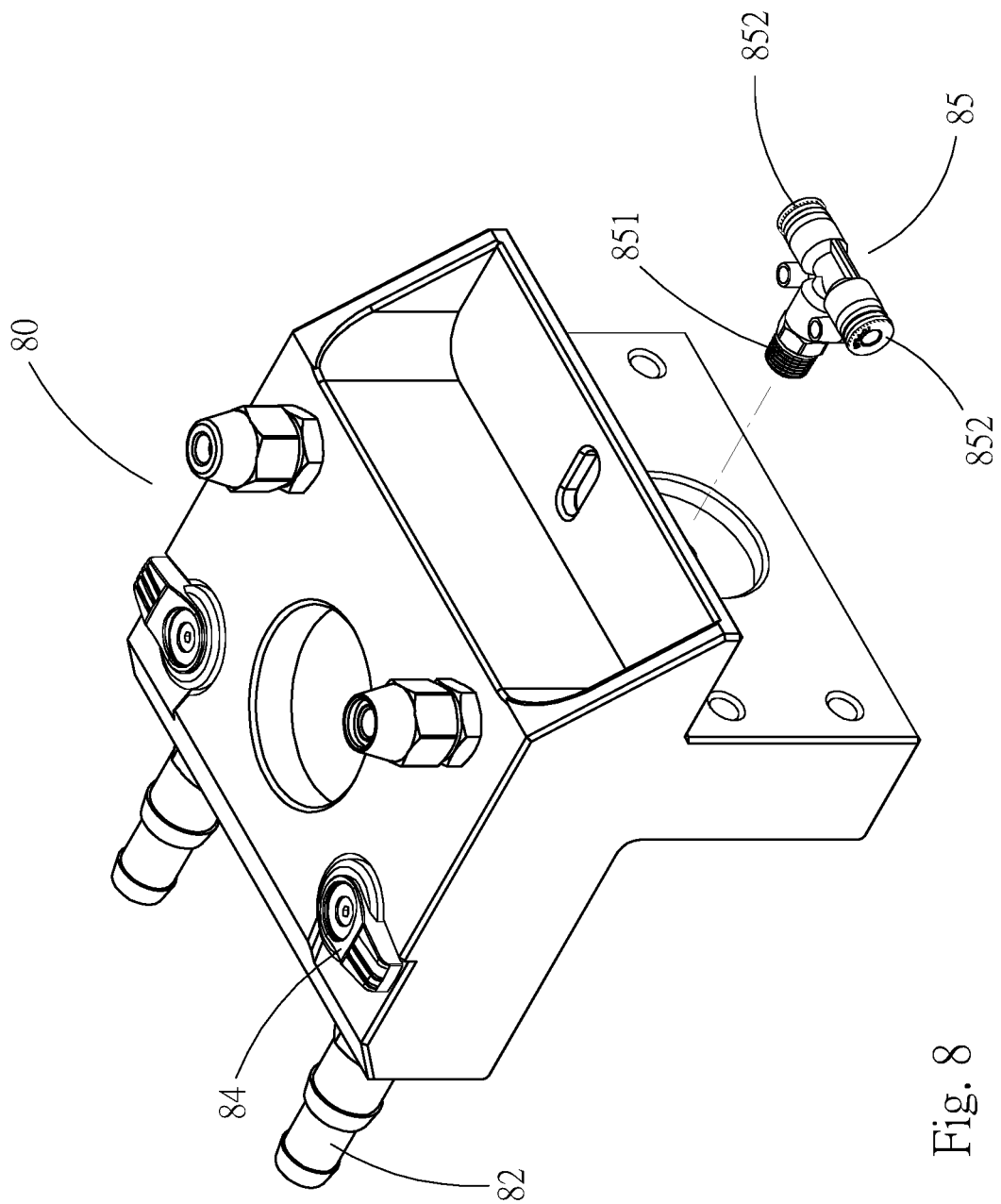
FIG. 8 is a perspective view of the power transmission member of the first embodiment of the present invention.
Figure 9:
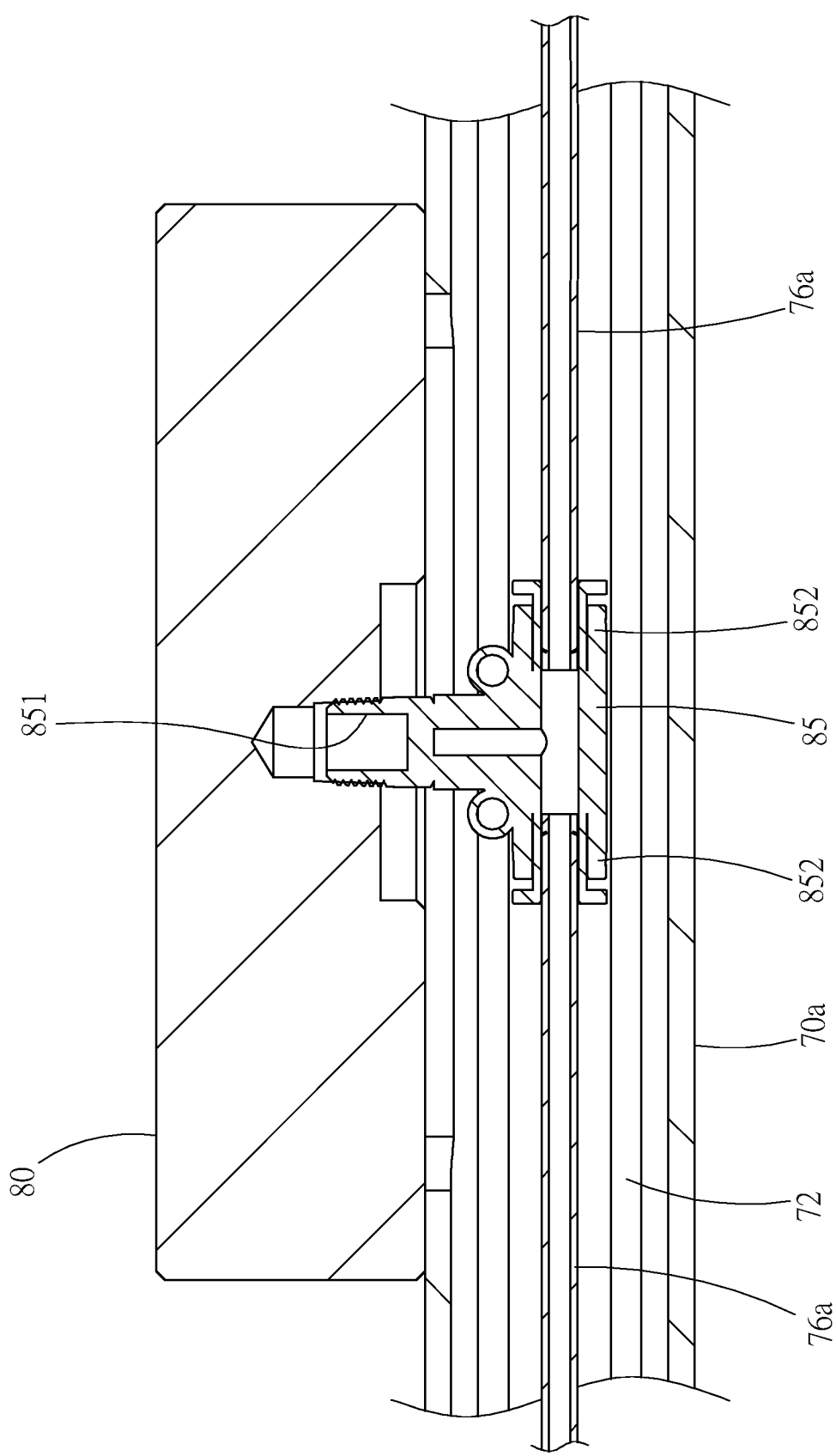
FIG. 9 is a sectional view taken along line 9-9 of FIG. 1.

In this embodiment, high-pressure air is employed as a power source for the movable seat 20 and the rail device 10. Please refer to FIGS. 8 and 9. A power transmission member 80 is mounted on the first beam 70a. The power transmission member 80 has at least one input port, at least one output port and at least one rotary button 84. The input port is a connector 82 connected to a high-pressure air power source. The rotary button 84 serves to open or close a flow passage (not shown) disposed in the power transmission member 80. The output port is a three-way connector 85 mounted on the power transmission member 80 and positioned in the beam 70a. The connector 85 has an input end 851 and two output ends 852. The input end 851 is for inputting the high-pressure air. Two tube bodies 76a are positioned in the passage 72 of the beam 70a. First ends of the tube bodies 76a are connected with the two output ends 852 for outputting the high-pressure air. The tube bodies 76 are disposed in the passages 72 of each of the four beams 70 to transfer the high-pressure air.

Figure 10:
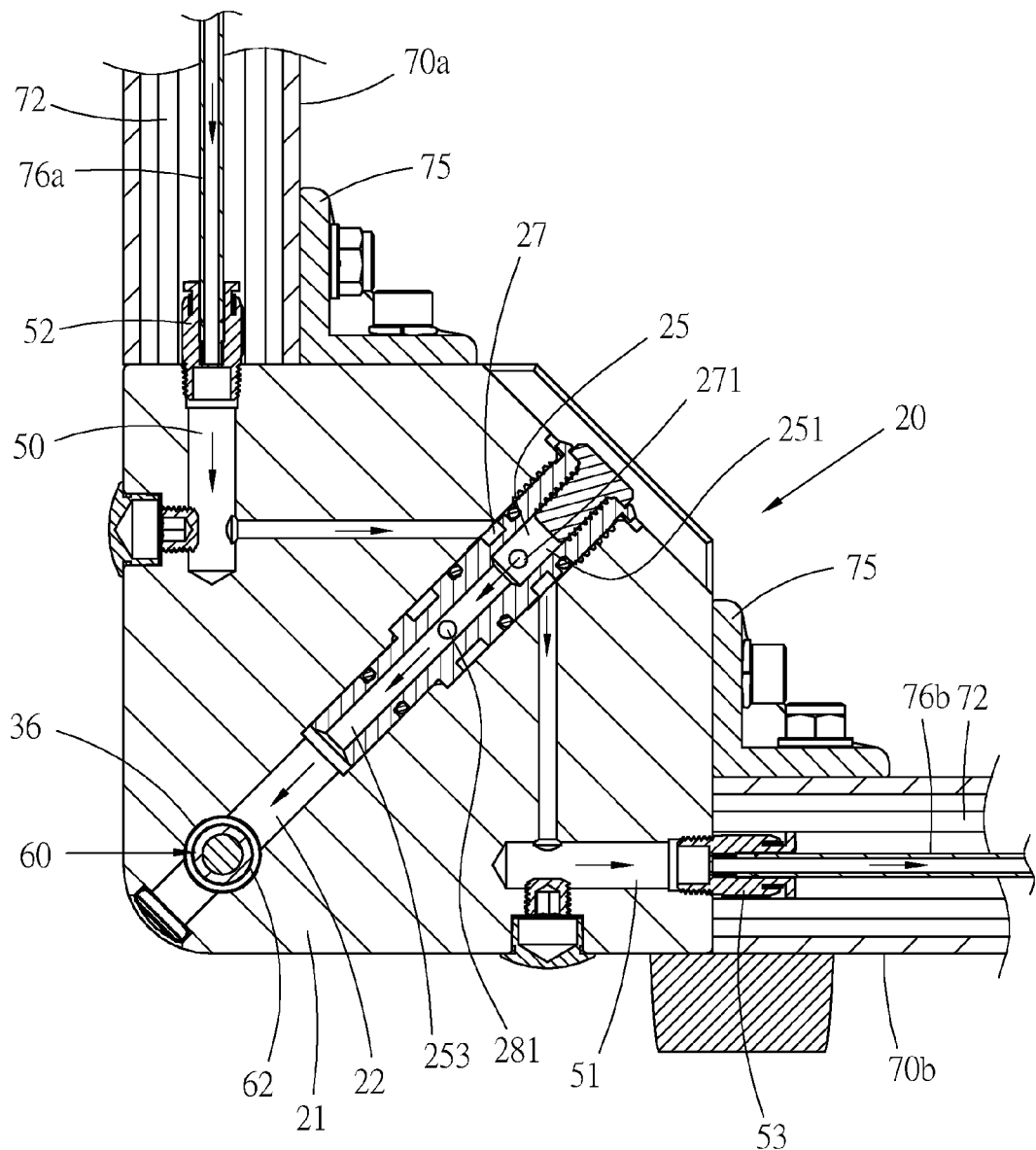
FIG. 10 is a sectional view taken along line 10-10 of FIG. 1.
Figure 11:
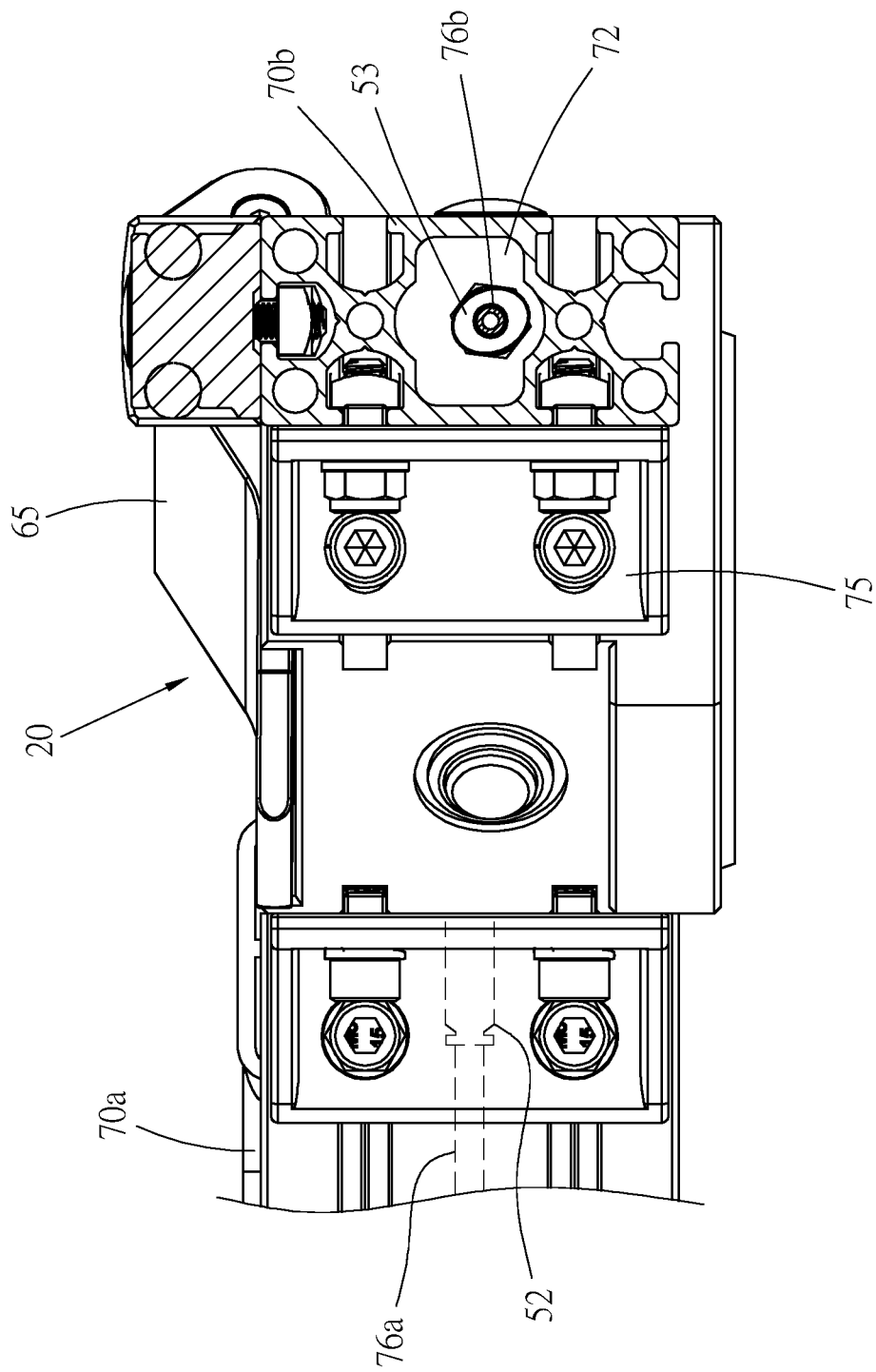
FIG. 11 is a sectional view taken along line 11-11 of FIG. 1.

Please refer to FIGS. 10 and 11. The connector 52 of the air intake passage of one lateral face of a movable seat 20 is connected with one tube body 76a of the beam 70a. The connector 53 of the relay passage of the other lateral face is connected with another tube body 76b disposed in a second beam 70b. The high-pressure air flows from the tube body 76a into the air intake passage 50 of one side of the movable seat 20. Then, the high-pressure air flows into the first annular groove 27 of the valve member 24. The high-pressure air in the annular groove 27 is then divided into two flow directions. One of the flow directions goes from the first radial hole 271 into the flow way 25 of the valve member 24. The other of the flow directions goes to the relay passage 51 of the other side of the movable seat 20. At this time, the relay passage 51 transfers the high-pressure air to the tube body 76b of the second beam 70b, whereby the high-pressure air is supplied to another movable seat connected with the other end of the tube body 76b. Accordingly, the tube bodies 76 of the beams 70 are serially connected between the air intake passages and relay passages of the movable seats 20 to form a high-pressure air supply flow way. Through the high-pressure air supply flow way, the high-pressure air can be supplied to all the movable seats. It should be noted that each movable seat 20 can have only one air intake passage 50 and multiple independent tube bodies are employed to respectively supply the high-pressure air to each the movable seats.

Figure 12:
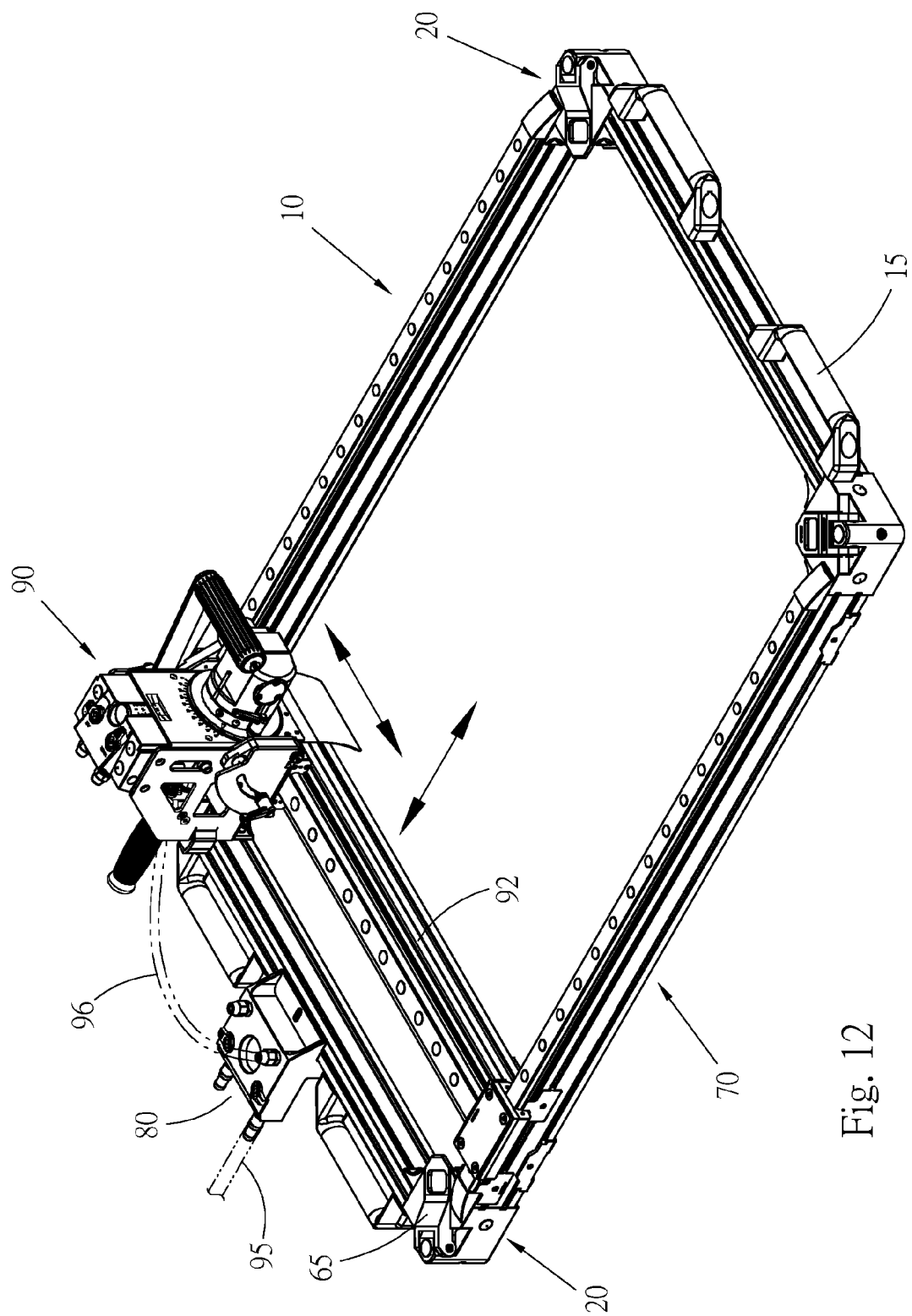
FIG. 12 is a perspective view showing an application of the rail device of the present invention.

Please refer to FIG. 12, which shows an application of the rail device 10. A slide rail 92 is slidably mounted between the second pair of beams 70b. A processing machine 90 is mounted on the slide rail 92 and slidable along the slide rail 92. Accordingly, the processing machine 90 can be two-dimensionally moved to process a work piece or board material. The processing machine can be an electrical or pneumatic apparatus. In this application, the processing machine 90 is a pneumatic apparatus. A pipeline 95 of high-pressure air is connected with the power transmission member 80. A pipeline 96 is connected between the power transmission member 80 and the processing machine 90 to provide high-pressure air for the processing machine.

Figure 13:
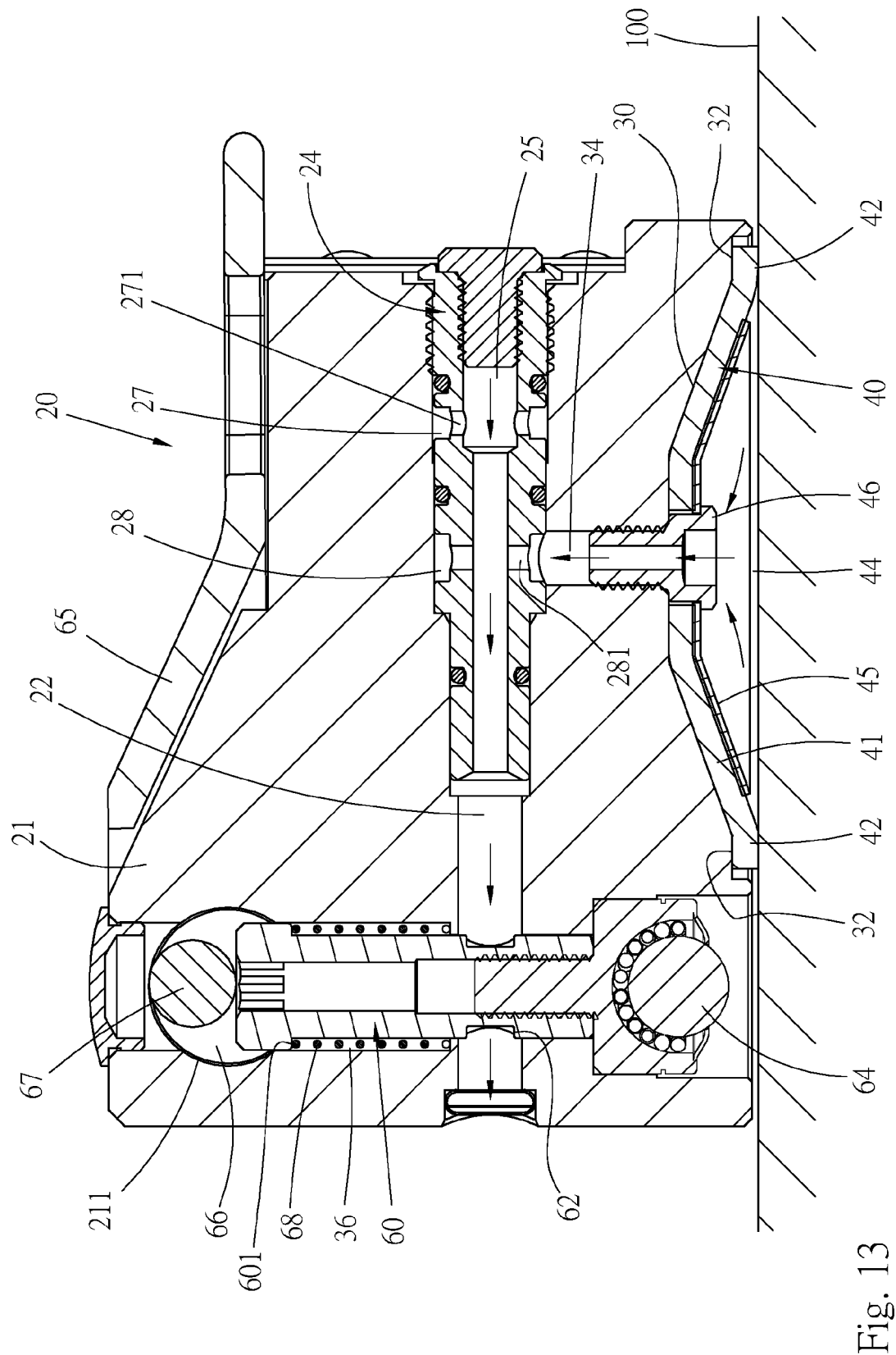
FIG. 13 is a sectional view showing that the movable seat of the present invention sucks and attaches to a plane face.

In use, the rail device 10 is rested on a plane face 100, as shown in FIG. 13. The plane face 100 can be a surface of a work piece to be cut or a surface of a board material to be cut. Alternatively, the plane face 100 can be a working table face made of various materials.

Figure 14:
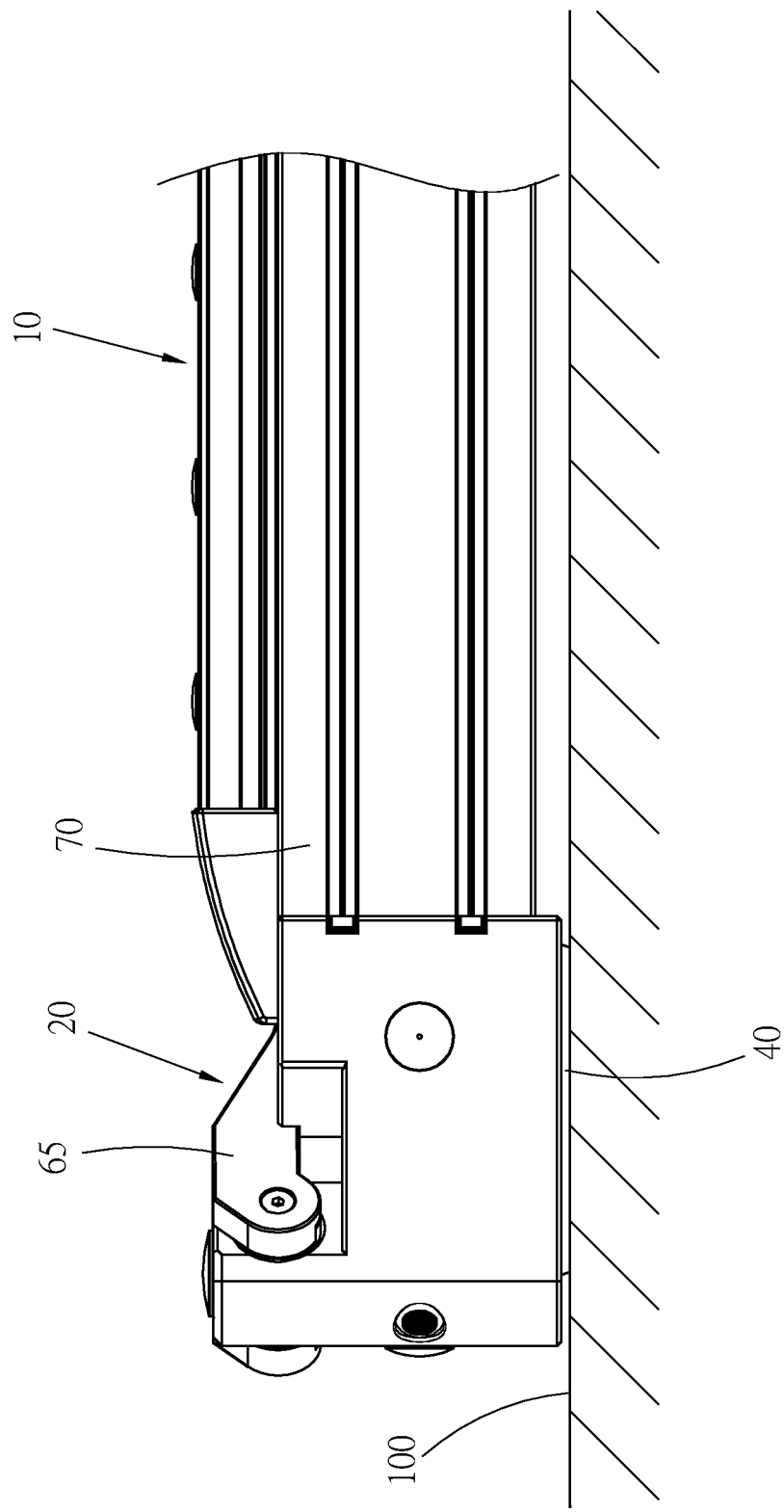
FIG. 14 is a side view of a part of the rail device of the present invention, showing that the rail device is in a located state.

FIG. 13 shows that the lever member 65 is positioned in the locking position and the support column 60 is positioned in the communication position, the motional section 64 of the bottom end of the support column is positioned inside the slide passage 36 without protruding out of the main body 21 and the communication section 62 of the support column is right positioned in the air passage 22 without blocking the air passage, permitting air to flow through the air passage. In this state, the high-pressure air can flow along the tube bodies 76 toward the air intake passages 50 of every movable seat 20 and then flow into the air passage 22 of the movable seat. The high-pressure air then flows from the first annular groove 27 into the flow way 25 of the valve member 24 and form fast-speed airflow, making the sucker 40 create sucking force. In this case, the movable seat 20 sucks and attaches to the surface 100 to affix the rail device 10 on the surface 100 without possibility of move as shown in FIG. 14.

According to Bernoulli's principle that as the speed of a moving fluid (liquid or gas) increases, the pressure within the fluid decreases, the present invention makes the sucker create sucking force. As shown in FIG. 13, the flow way 25 forms a fast-flow section of airflow. One end of the air sucking passage 34 of the sucker 40 just communicates with the flow way 25, the air in the flow way is a fast airflow with low pressure. Relative to the fast airflow, the air in the air chamber 44 and the air sucking passage 34 of the sucker 40 flows slowly with high pressure. Under the effect of the pressure difference, the air in the air chamber 44 and the air sucking passage 34 will be sucked to the flow way 25. Under such circumstance, a negative pressure (the air pressure is lower than the atmospheric pressure) is created in the air sucking passage 34 and the air chamber 44 to make the sucker 40 create sucking force to suck and attach to the surface 100. When creating the sucking force, the lip 42 of the annular wall 41 of the sucker 40 snugly attaches to the annular abutment face 32 of the cavity 30.

According to the applicant's test result of real sample, the sucker 40 of the present invention can suck and attach to different surfaces of different materials, for example, surfaces of metal, glass, wooden material, stone material, brick and concrete material. After the rail device 10 is located by means of the movable seats 20, the operator can operate the processing machine to cut or mill the work piece.

The present invention can quickly release the rail device 10 from the locating state to easily move the device 10. Please refer to FIG. 15. When it is desired to stop the sucker 40 from creating the sucking force, an operator only needs to shift the lever member 65 to the releasing position. In this case, the cam section 67 is moved to a lower dead end (second dead end) to downward push the support column 60 to the operation position. At this time, the motional section 64 of the bottom end of the support column 60 protrudes out of the bottom face of the main body 21 and the communication section 62 leaves the air passage 22. The rear end of the air passage 22 is blocked by the support column 60 to hinder the air in the air passage 22 and the flow way 25 from flowing. Under such circumstance, the pressure difference between the flow way 25 and the air sucking passage 34 is small or zero and the sucker 40 no longer creates sucking force. Accordingly, the sucking force provided by the movable seats 20 quickly disappears, whereby the rail device 10 becomes transferable. Also, the motional sections (rolling balls) 64 of the bottom faces of the four movable seats 20 on four corners of the rail device contact the surface 100, enabling an operator to easily transfer the rail device 10.

After the rail device 10 is moved to next working position or site, the lever member 65 is again shifted to the locking position and restored to the state as shown in FIG. 13. At this time, the sucking force of the sucker 40 of the movable seat 20 is recovered and the rail device 10 can again provide sucking force and relocate.

The movable seats of the present invention can conveniently and quickly create sucking force, whereby the rail device composed of one or multiple movable seats can be quickly located and released from the locating state. After released, the rail device can be conveniently moved. Therefore, the mobility and flexibility of the rail device and the processing machine are enhanced.

Figure 17:
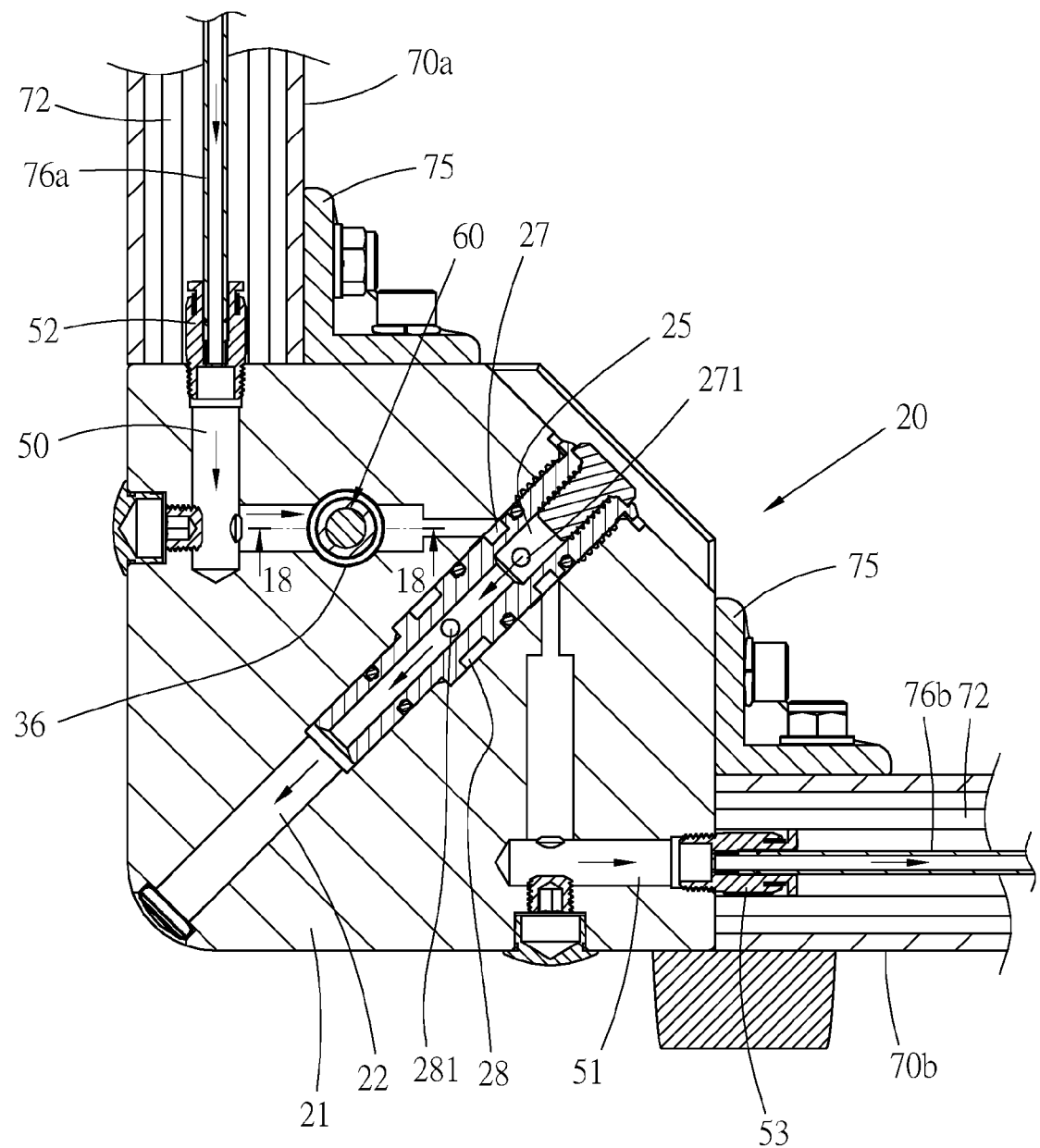
FIG. 17 is a sectional view of a part of another embodiment of the rail device of the present invention.
Figure 18:
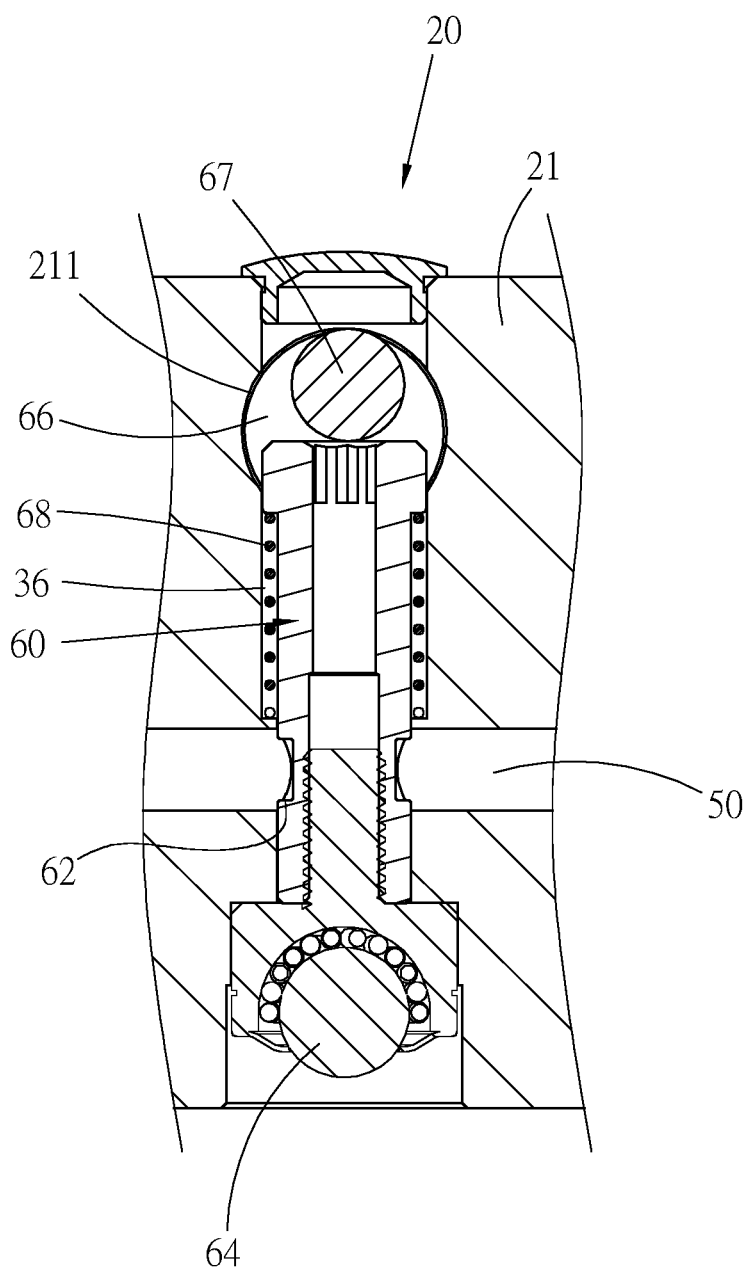
FIG. 18 is a partially sectional view taken along line 18-18 of FIG. 17.

The above embodiment is only used to illustrate the present invention, not intended to limit the scope thereof. Many modifications of the above embodiment can be made without departing from the spirit of the present invention. For example, FIGS. 17 and 18 show another embodiment of the rail device of the present invention. In practice, the slide passage 36 can intersect the air intake passage 50, whereby the support column 60 can block or unblock the air intake passage 50, permitting the high-pressure air to flow within the air passage 22 or stopping the high-pressure air from flowing. This embodiment can also control the sucking force of the sucker.

Furthermore, when the support column is positioned in the blocking position, the bottom end of the support column is totally moved out from the air passage or the air intake passage, whereby the air passage or the air intake passage is in a communication state. Also, for example, the lever member is free from the cam section for driving the support column to move. Instead, the lever member is pivotally connected with one end of the support column, whereby by means of leverage, the lever member can drive the support column to move between the communication position and the blocking position.

What is claimed is:

1. A movable seat comprising:
    a main body;
    an air passage formed in the main body, the air in the air passage being able to flow out of the air passage;
    a sucker disposed under a bottom face of the main body; an air chamber being defined in the sucker;
    an air sucking passage disposed in the main body, one end of the air sucking passage communicating with the air passage, an other end of the air sucking passage communicating with the air chamber of the sucker;
    an air intake passage disposed in the main body, an inner end of the air intake passage communicating with the air passage, whereby air flows through the air intake passage into the air passage;
    a slide passage disposed in the main body and intersecting the air passage or the air intake passage;
    a support column disposed in the slide passage of the main body and movable along the slide passage; and
    an operation/control member mounted on the main body and operable between a locking position and a releasing position to drive the support column to move; when the operation/control member is positioned in the locking position, the support column being positioned in a communication position, whereby the air passage or the air intake passage keeps in a communication state, when air flows through the air passage, the air in the air sucking passage being sucked to the air passage, when the operation/control member is positioned in the releasing position, the support column being positioned in a blocking position to block the air passage or the air intake passage.

2. The movable seat as claimed in claim 1, wherein when the support column is positioned in the blocking position, a bottom end of the support column protrudes out of the bottom face of the main body.

3. The movable seat as claimed in claim 2, wherein a motional section is disposed at the bottom end of the support column.

4. The movable seat as claimed in claim 1, wherein the operation/control member is a lever member having a cam section, the lever member being pivotally connected with the main body and shiftable; when the operation/control member is positioned in the locking position and the releasing position, the cam section being respectively positioned in a first dead end and a second dead end; further comprising an elastic member disposed in the slide passage, the elastic member serving to provide elastic energy to make the support column move toward the cam section of the lever member and keep one end of the support column in contact with the cam section.

5. The movable seat as claimed in claim 1, wherein the support column has a body section formed with a communication section; when the support column is positioned in the communication position, the communication section being positioned in the air passage or the air intake passage, when support column is positioned in the blocking position; the communication section leaving the air passage or the air intake passage.

6. The movable seat as claimed in claim 1, further comprising a valve member having a longitudinal flow way, the valve member being disposed in the air passage, a rear end of the flow way communicating with the air passage; the inner end of the air intake passage communicating with the flow way; one end of the air sucking passage communicating with the flow way of the valve member, the position where the air sucking passage communicating with the flow way being positioned behind the position where the air intake passage communicating with the flow way.

7. The movable seat as claimed in claim 6, wherein the valve member is an elongated body; a first annular groove and a second annular groove being formed on a circumference of the valve member; a first radial hole being formed in the valve member, two ends of the first radial hole respectively communicating with the first annular groove and the flow way; a second radial hole being formed in the valve member, one end of the second radial hole communicating with the second annular groove, while the other end of the second radial hole communicating with the flow way; the inner end of the air intake passage communicating with the first annular groove; one end of the air sucking passage communicating with the second annular groove.

8. The movable seat as claimed in claim 1, wherein a cavity is formed under the bottom face of the main body, an annular abutment face being formed around the cavity; the sucker having an annular wall, the air chamber being defined in the annular wall of the sucker, the sucker being disposed in the cavity, an outer circumference of the annular wall of the sucker protruding out of the cavity, a protrusion section of the annular wall forming a lip positioned right under the annular abutment face and freely flexible; an angle being contained between the lip and the annular abutment face; when the air of the air sucking passage is sucked to the air passage, the sucker creates sucking force to make the lip attach to the annular abutment face.

9. The movable seat as claimed in claim 1, further comprising a relay passage formed in the main body, one end of the relay passage communicating with both the air passage and the air intake passage.

10. The movable seat as claimed in claim 7, further comprising a relay passage formed in the main body, one end of the relay passage communicating with the first annular groove.

11. A movable seat comprising:
a main body;
an air passage formed in the main body, the air in the air passage being able to flow out of the air passage;
a sucker disposed under a bottom face of the main body, an air chamber being formed in the sucker;
an air sucking passage disposed in the main body, one end of the air sucking passage communicating with the air passage, an other end of the air sucking passage communicating with the air chamber of the sucker;
an air intake passage disposed in the main body, an inner end of the air intake passage communicating with the air passage, whereby air flows through the air intake passage into the air passage;
a slide passage disposed in the main body and intersecting the air passage or the air intake passage, a bottom end of the slide passage passing through the main body to the bottom face of the main body;
a support column disposed in the slide passage of the main body and movable along the slide passage;
a rolling member disposed at the bottom end of the support column; and
an operation/control member mounted on the main body and operable between a locking position and a releasing position to drive the support column to move; when the operation/control member is positioned in the locking position, the support column being positioned in a communication position, whereby the air passage or the air intake passage keeps in a communication state, when air flows through the air passage, the air in the air sucking passage being sucked to the air passage; when the operation/control member is positioned in the releasing position, the support column being positioned in a blocking position to block the air passage or the air intake passage; when the support column is positioned in the blocking position, the rolling member protruding out of the bottom face of the main body.

12. A rail device with movable seat, comprising:
at least one movable seat as claimed in claim 1;
a pair of parallel first beams; and
a pair of parallel second beams, the first and second beams and the movable seat being connected with each other to form the rail device with a parallelogram configuration.

13. The rail device as claimed in claim 12, further comprising a power transmission member for transmitting pressured air, the power transmission member being disposed on the rail device; multiple tube bodies being connected between the power transmission member and the movable seat.

14. The rail device as claimed in claim 13, wherein each of the first and second beams is formed with an internal longitudinal passage; the tube bodies being disposed in the passages of the beams.

15. The rail device as claimed in claim 13, wherein each of the at least one movable seat has two lateral faces, an outer end of the air intake passage being positioned on one of the lateral faces of the movable seat; a relay passage being formed in each the movable seat, an inner end of the relay passage communicating with the air intake passage and the air passage, an outer end of the relay passage being positioned on the other lateral face of the movable seat; the two lateral faces of each the movable seat being respectively connected with one of the first beams and one of the second beams, one of the tube bodies being disposed in said first beam, one end of the one of the tube bodies being connected with the outer end of the air intake passage/relay passage, the other of the tube bodies being disposed in the second beam, one end of the other tube body being connected with the outer end of the relay passage/air intake passage.

16. The rail device as claimed in claim 13, wherein the power transmission member is disposed on a first beam, the power transmission member having an input port and an output port; two movable seats being respectively connected with two ends of the first beam; the output port of the power transmission member being a three-way connector having two output ends; first ends of two of the tube bodies being respectively connected with the output ends of the power transmission member, second ends of the two tube bodies being respectively connected with the air intake passages of the two movable seats.

17. The rail device as claimed in claim 12, wherein the bottom end of the slide passage of each movable seat passes through the main body to the bottom face of the main body; when the support column is positioned in the blocking position, the bottom end of the support column protruding out of the bottom face of the main body.

18. The rail device as claimed in claim 12, further comprising a relay passage formed in the main body of the movable seat, one end of the relay passage communicating with the first annular groove.

* * * * *